United States Patent Office 2,914,837
Patented Dec. 1, 1959

2,914,837

METHOD OF MANUFACTURING SELENIUM RECTIFIER CELLS

Hans Schweickert and Johann Adolf Herlet, Pretzfeld, Bayern, Germany, assignors to Siemens-Schuckertwerke Aktiengesellschaft, Berlin, Germany, a corporation of Germany No Drawing. Application June 10, 1953
Serial No. 360,808

Claims priority, application Germany June 19, 1952

9 Claims. (Cl. 29—25.3)

Our invention relates to the manufacture of selenium rectifier cells.

Such cells, having generally the shape of a plate, disc or pellet, form the basic elements of selenium rectifiers and are each essentially composed of a base electrode, a selenium layer deposited thereon, and a counter electrode covering the selenium layer. The cell may include other layers, for instance, a selenide layer between the base electrode and the selenium layer, and an intermediate layer between the selenium and the counter electrode. The latter intermediate layer may consist of a varnish coating or a semiconductor of special properties.

Several rectifier cells, mounted together to a structural entity, form a rectifier stack; and a number of such stacks, combined and electrically interconnected in a rectifier circuit, form a rectifier set or assembly. The quality of such an assembly is largely determined by its efficiency, i.e. the ratio of the rectified power output to the alternating power input. To give this ratio a high value, the losses occurring within the rectifier must be kept as small as possible. These losses are composed of those in the forward (conducting) direction and those in the reverse (blocking) direction. For any given alternating voltage to be rectified, the losses in the forward direction are a minimum if the smallest possible number of cells are series connected. This requires subjecting the individual cells to as large a voltage as feasible. It has, therefore, been attempted to provide rectifier cells which not only combine good forward conductance with high blocking voltage but which also retain these qualities during long periods of continuous operation.

So far, various methods of manufacturing selenium rectifier cells have become known that attempt realizing this aim by using particular metals as counter electrodes, or providing artificially deposited intermediate layers, or subjecting the selenium surface to additional chemical treatment. While the blocking voltage can be increased by such methods, they have the disadvantage of considerably increasing the forward resistance.

It is an object of our invention to devise a method of manufacturing selenium rectifier cells that achieve a considerable increase in blocking voltage without appreciable change in forward resistance.

The method according to our invention involves the conventional evaporation process of depositing selenium from the vaporous phase onto a base electrode. This process requires placing an electrode member, such as a plate of aluminum, into an evacuated receptacle and heating the selenium within the vacuum so that the evolving selenium vapors precipitate a selenium coating on the electrode. Now, according to our invention, we simultaneously evaporate in the vacuum a crystallization modifying substance reactionable with the selenium; and we control the evaporation of the modifier as to its distribution and/or quantity in the selenium layer so that the selenium that forms the interior of the selenium layer crystallizes at a higher velocity than the selenium in the surface zone. To secure such a difference in crystallizing behavior, we maintain the partial vapor pressure of the modifying substance part of the time at a value of up to $10^{-2}$ mm. Hg, preferably at about $10^{-3}$ mm. Hg, and reduce that partial pressure or fully omit the depositing of the modifier during another part of the time during which the selenium is being precipitated.

The physical effects of this method, verified by test results may be explained as follows.

According to the prevalent processes of manufacturing selenium rectifier cells, including the method according to our invention, the intermediate layer essential for the desired barrier effect is formed between the selenium layer and the counter electrode by having the selenium react with a suitable metal or alloy of the counter electrode, such as tin-cadmium or tin-cadmium-bismuth. The resulting "reaction layer" depends as to its degree of uniformity upon the uniformity of the surface zone of the selenium layer. This surface uniformity of the selenium layer is determined by the course of the crystallization occurring within the selenium layer that precipitates from the vapor phase onto the back plate in an initially still partially amorphous state. In selenium layers made according to the known methods, the crystallization progresses very irregularly. It commences from a multitude of crystallization germs or points of disturbance which, as a rule, are irregularly distributed throughout the selenium layer. Such points are also located at the surface of the selenium layer. Consequently, with the prior methods, the crystallization of the selenium commences partly at the surface and partly at points in the interior of the selenium layer. This results of necessity in irregularity of the surface zone of the selenium layer as regards its crystalline structure. According to the invention, care is taken to obtain in the inner range of the selenium layer a higher crystallization velocity than in its surface zone. As a result, and even if the surface zone contains germ points at which the crystallization tends to start, the crystallization commencing from germ points in the interior of the layer progresses so rapidly that any commencing crystallization in the surface zone is overwhelmed, so to say, by the crystallization growing out of the interior. This has the consequence that the surface zone of the selenium layer assumes the uniform crystalline texture desired for the above-mentioned reasons. By virtue of the uniform texture at the surface of the selenium layer, the reaction layer, caused by the reaction of the surface zone with the material of the counter electrode, also assumes a higher degree of uniformity over its area. This, in turn, is the reason why rectifiers produced according to the invention withstand a higher inverse voltage for a given magnitude of the inverse current than could heretofore be attained.

The required difference in crystallization velocities between the inner range and the surface zone of the selenium layer may be achieved in two different ways. One way is to add a crystallization accelerating modifier to the inner zone of the selenium layer, leaving the surface zone free or essentially free of the modifying substance. The other way is to add a crystallization retarding modifier only or essentially only to the surface zone of the selenium layer. Such crystallization retarding modifiers are, for instance phosphorus, arsenic and antimony. It is also possible to apply combinations of the two methods, for instance, so that a crystallization promoting substance is added to the interior of the selenium layer, while a crystallization retarding modifier is added to the surface zone. Among the various additive agents known as crystallization modifiers for selenium, we prefer, for the purpose of our invention, mainly those substances which, by virtue of a low vapor pressure, can readily be given the desired dosage. These substances may be liquid, semi-solid, or solid. Liquid crystallization accelerators of this kind are, for instance, mineral oils, tricresyl phosphates, chlorinated divinyl and similar compounds. Suitable semi-solid accelerators are fats, waxes and paraffins. Suitable solid accelerators are sulfur, tellurium and carbon. Compounds or mixtures of these substances are also applicable.

We have found by numerous tests that quantity and distribution of the modifier in the selenium layer are essential for securing best results. The quantity and the distribution are dependent upon the selected partial vapor pressure of the modifier. If the proportion of the modifier in the selenium layer is too small, the desired improvement of the blocking properties of the rectifier element are only partially attained. If the proportion of the modifier is too large, the desired increase of the blocking voltage is obtained but the forward resistance of the cell is simultaneously increased so that, in totality, no improvement may result. For this reason, the partial pressure of the modifier during the evaporation step should not exceed the above-mentioned limit of about $10^{-2}$ mm. Hg. We have found a partial pressure of about $10^{-3}$ mm. Hg especially favorable and reliable. This partial pressure of the evaporating modifier can be adjusted and maintained by a corresponding adjustment or regulation of the evaporation temperature.

The method according to the invention may be carried out, for instance, in the following manner. Two evaporation vessels such as pans, trays or plane plates are placed into a vacuum chamber, one for the selenium and the other for the modifier. The back plate, for instance of aluminum, which is to serve as the base electrode of the cell is mounted above the two trays. It is preferable to provide both evaporation vessels with adjustable heating devices, for instance electric heaters, so that the temperature of the selenium and of the modifier to be evaporated can be set or regulated to any value within the available limits in accordance with temperature indications. The temperature indications are preferably obtained from thermo-elements mounted on the individual evaporation vessels.

The evaporation is carried out after thus establishing the proper conditions (temperature, vacuum) for the evaporation process. An evaporation temperature of 250 to 350° C. for the selenium is suitable for this process. The temperatures of the selenium and of the modifier are then regulated, and the temperature of the modifier is set to the value corresponding to the above-mentioned partial pressure of up to $10^{-2}$ and preferably about $10^{-3}$ mm. Hg. The example here being described is in accordance with the above-mentioned first way. That is, a crystallization promoting modifier is added to the inner range of the selenium layer. As soon as the selenium layer has reached a thickness as desired for the inner range of the layer, the evaporation of the modifier is discontinued or essentially reduced. This thickness of the inner range may amount to about ⅔ of the total thickness of the finished selenium coating. This is done by wholly or partially closing the outlet opening of the evaporation vessel by means of a mechanical diaphragm or cover, or by reducing the temperature of the modifier evaporating vessel. Thereafter, the surface zone of the selenium layer is precipitated without the modifier by continuing the evaporation of the selenium alone. After this the desired selenium layer is deposited upon the back plate, the plate with the deposited selenium can be removed from the vacuum chamber, and the further fabrication can be carried out in the known manner.

Although the crystallization of the selenium layer may be effected simultaneously with the above-described evaporation process depending upon the nature of the material used for the back plate and the other conditions of the evaporation process, it is preferable to conduct the process in such a manner that the precipitated selenium layer is to a large proportion, in the amorphous state. The deposited selenium layer is subsequently subjected to crystallization, i.e. to a heat treatment resulting in crystallization. This treatment may be conducted, as known, at a temperature of 110° C. For further completing the rectifier cells, the various known and conventional methods may be applied.

According to one of these known methods a cadmium-containing cover electrode, for instance of a tin-cadmium alloy, is deposited by spraying onto the selenium layer after completion of the crystallization process. Subsequently, the selenium layer is thermically treated to convert it into its best conducting state and to simultaneously produce the reaction layer between the selenium and the cover electrode. This thermal treatment may consist in subjecting the selenium layer, already covered by the counter electrode, to a temperature of 210° C. for a period of time sufficient to impart optimum conductivity to the selenium. In most cases, a subsequent electro-forming process is employed. That is, an electric voltage in the reverse direction is applied to the cell, for instance, for one or several hours.

According to another method, the counter electrode is applied after the selenium layer is heat treated to assume its best conducting form. The reaction layer, essential for the blocking ability of the rectifier cell, is then produced by the subsequent electro-forming process. As far as the crystallization of the selenium layer, the application of the counter electrode and the production of the reaction layer between selenium and counter electrode are concerned, the invention is not limited to the above-described examples but also permits the use of other suitable methods.

While referring in the foregoing to a base electrode in the shape of a back plate, it will be understood that it is not essential to the invention whether the base electrode is plate shaped, pellet shaped, plane or curved.

We claim:

1. In the manufacture of selenium rectifier cells, the process of depositing, over a period, a layer of amorphous selenium on a base electrode, applying crystallite growth-velocity modifier substance to the selenium during the period within which the amorphous selenium is being deposited, the selenium deposition and the application of the modifier substance being carried out by vaporizing them and passing the vapors over the base electrode, the modifier substance being vaporized under vacuum, the partial pressure of the vapor of the modifier being not higher than about $10^{-2}$ mm. Hg, controlling the subsequently produced rate of growth of the crystallites across the depth of the layer to obtain a higher rate in the region adjacent the base electrode than in the portion of the layer more remote from the base electrode, the said control being obtained by changing the proportion of the modifier substance with respect to the selenium being deposited during said deposition period and as the deposited layer of selenium increases in depth, thereafter crystallizing the amorphous layer of selenium by heating, and applying a counter electrode at the face of the rectifier opposite the base, to form the cell.

2. In the manufacture of selenium rectifier cells, the process of depositing, over a period, a layer of amorphous selenium on a base electrode, applying crystallite growth-velocity modifier substance to the selenium during the period within which the amorphous selenium is being deposited, the modifier being taken from the group consisting of substances accelerating and substances decelerating crystallite growth, the selenium deposition and the application of the modifier substance being carried out by vaporizing them and passing the vapors over the base electrode, the modifier substance being vaporized under vacuum, the partial pressure of the vapor of the modifier being not higher than about $10^{-2}$ mm. Hg, controlling the subsequently produced rate of growth of the crystallites across the depth of the layer to obtain a higher rate in the region adjacent the base electrode than in the portions of the layer more remote from the base electrode, the proportion of modifier being decreased during said period in the case where an accelerating substance is used, the proportion of modifier being increased during said period in the case where decelerating substance is used, the said control being obtained by changing the proportion of the modifier substance with respect to the selenium being deposited during said deposition period and as the deposit of selenium increases in depth, thereafter crystallizing the amorphous layer of selenium by heating, and applying a counter electrode at the face of the rectifier opposite the base, to form the cell.

3. In the manufacture of selenium rectifiers, the process of depositing, over a period, a layer of amorphous selenium on a base electrode, applying crystallite growth-velocity accelerator substance to the selenium during the period within which the selenium is being deposited, the selenium deposition and the application of the accelerator substance being carried out by vaporizing them and passing the vapors over the base electrode, the accelerator substance being vaporized under vacuum, the partial pressure of the vapor of the accelerator being not higher than about $10^{-2}$ mm. Hg, controlling the subsequently produced rate of growth of the crystallites across the depth of the layer to obtain a higher rate in the region adjacent the base electrode than in the portions of the layer more remote from the base electrode, the said control being obtained by decreasing the proportion of the accelerator substance with respect to the selenium being deposited during said deposition period and as the deposited layer of selenium increases in depth, thereafter crystallizing the amorphous layer of selenium by heating, and applying a counter electrode at the face of the rectifier opposite the base, to form the cell.

4. In the manufacture of selenium rectifiers, the process of depositing, over a period, a layer of amorphous selenium on a base electrode, applying crystallite growth-velocity modifier substance to the selenium during the period within which the amorphous selenium is being deposited, the selenium deposition and the application of the modifier substance being carried out by vaporizing them and passing the vapors over the base electrode, the modifier substance being vaporized under vacuum, the partial pressure of the vapor of the modifier being not higher than about $10^{-2}$ mm. Hg, controlling the subsequently produced rate of growth of the crystallites across the depth of the layer to obtain a higher rate in the region adjacent the base electrode than in the portion of the layer more remote from the base electrode, a growth accelerator substance being employed as the said modifier while the selenium is being deposited in the region immediately adjacent the base electrode, the proportion of accelerator being decreased during said period, a growth decelerator substance being employed as the modifier while the selenium portion more remote from the base plate is being deposited, the said control being obtained by changing the proportion of the modifier substance with respect to the selenium being deposited, during said period, as the deposit of selenium increases in depth, thereafter crystallizing the amorphous layer of selenium by heating, and applying a counter electrode at the face of the rectifier opposite the base, to form the cell.

5. In the manufacture of selenium rectifier cells, the process of depositing, over a period, a layer of amorphous selenium on a base electrode, applying crystallite growth-velocity modifier substance to the selenium during the period within which the amorphous selenium is being deposited, the selenium deposition and the application of the modifier substance being carried out by vaporizing them and passing the vapors over the base electrode, the modifier substance being vaporized under vacuum, the partial pressure of the vapor of the modifier being not higher than about $10^{-2}$ mm. Hg, controlling the subsequently produced rate of growth of the crystallites across the depth of the layer to obtain a higher rate in the region adjacent the base electrode than in the portion of the layer more remote from the base electrode, the said control being obtained by changing the proportion of the modifier substance with respect to the selenium being deposited, during said period, as the deposit of selenium increases in depth, thereafter crystallizing the amorphous layer of selenium by heating, and applying a cadmium containing counter electrode at the face of the rectifier opposite the base, to form the cell, and subjecting the cell to heating to produce a reaction layer between the selenium layer and the electrode.

6. In the manufacture of selenium rectifier cells, the process of depositing, over a period, a layer of amorphous selenium on a base electrode, applying crystallite growth-velocity modifier substance to the selenium during the period within which the amorphous selenium is being deposited, the modifier being taken from the group consisting of substances accelerating and substances decelerating crystallite growth, the selenium deposition and the application of the modifier substance being carried out by vaporizing them and passing the vapors over the base electrode, the modifier substance being vaporized under vacuum, the partial pressure of the vapor of the modifier being not higher than about $10^{-2}$ mm. Hg, controlling the subsequently produced rate of growth of the crystallites across the depth of the layer to obtain a higher rate in the region adjacent the base electrode than in the portions of the layer more remote from the base electrode, the proportion of modifier being decreased during said period in the case where an accelerating substance is used, the proportion of modifier being increased during said period in the case where decelerating substance is used, the said control being obtained by changing the relative partial pressures of the selenium and the modifier substance during said period to change the proportion of the modifier substance with respect to the selenium being deposited, during said period, as the deposit of selenium increases in depth, thereafter crystallizing the amorphous layer of selenium by heating, and applying a counter electrode at the face of the rectifier opposite the base, to form the cell.

7. In the manufacture of selenium rectifiers, the process of depositing, over a period, a layer of amorphous selenium on a base electrode, applying crystallite growth-velocity accelerator substance comprising mineral oil to the selenium during the period within which the selenium is being deposited, the selenium deposition and the application of the mineral oil accelerator substance being carried out by vaporizing them and passing the vapors over the base electrode, the accelerator substance being vaporized under vacuum, the partial pressure of the vapor of the accelerator being not higher than about $10^{-2}$ mm. Hg, controlling the subsequently produced rate of growth of the crystallites across the depth of the layer to obtain a higher rate in the region adjacent the base electrode than in the portions of the layer more remote from the base electrode, the said control being obtained by decreasing the proportion of the accelerator substance with respect to the selenium being deposited, during said period, as the deposited layer of selenium increases in depth, thereafter crystallizing the amorphous layer of selenium by heating, and applying a counter electrode at the face of the rectifier opposite the base, to form the cell.

8. The process defined in claim 1 in which the control is obtained by controlling the vaporizing temperatures of the modifier and of the selenium.

9. The process defined in claim 1 in which the control is obtained by vaporizing the modifier in a chamber under vacuum and controlling the egress of the modifier vapors from the chamber.

(References on following page)

References Cited in the file of this patent

UNITED STATES PATENTS

| | | |
|---|---|---|
| 2,175,016 | Brunke | Oct. 3, 1939 |
| 2,334,554 | Hewlett | Nov. 16, 1943 |
| 2,337,329 | Hewlett | Dec. 21, 1943 |
| 2,362,545 | Ellis | Nov. 14, 1944 |
| 2,462,906 | Sauerborn | Mar. 1, 1949 |
| 2,660,698 | Black | Nov. 24, 1953 |
| 2,662,832 | Middleton et al. | Dec. 15, 1953 |